(12) United States Patent
Chang et al.

(10) Patent No.: US 7,776,454 B2
(45) Date of Patent: Aug. 17, 2010

(54) TI BRAZING STRIPS OR FOILS

(75) Inventors: Chen-Chung S. Chang, Attleboro, MA (US); Bijendra Jha, North Attleboro, MA (US); Matthew J. Pohlman, Huntington Beach, CA (US)

(73) Assignee: EMS Solutions, Inc., Attleboro, MA (US)

( * ) Notice: Subject to any disclaimer, the term of this patent is extended or adjusted under 35 U.S.C. 154(b) by 1301 days.

(21) Appl. No.: 10/743,641

(22) Filed: Dec. 22, 2003

(65) Prior Publication Data

US 2004/0134966 A1     Jul. 15, 2004

Related U.S. Application Data

(63) Continuation-in-part of application No. 10/320,068, filed on Dec. 16, 2002, now Pat. No. 6,722,002.

(51) Int. Cl.
    *B32B 9/00*      (2006.01)

(52) U.S. Cl. .................. 428/688; 428/671; 428/674; 428/675; 428/680; 228/117; 228/262.3; 228/262.6

(58) Field of Classification Search .................. 428/660, 428/671, 674, 675, 680; 72/199; 148/516, 148/527, 536, 421; 228/101, 117, 262.1, 228/262.3, 262.6, 262.61, 262.31, 262.71, 228/262.72

See application file for complete search history.

(56) References Cited

U.S. PATENT DOCUMENTS

| | | | | |
|---|---|---|---|---|
| 2,753,623 | A | 7/1956 | Boessenkool et al. | 29/497.5 |
| 3,652,237 | A * | 3/1972 | Mizuhara | 428/583 |
| 3,854,194 | A | 12/1974 | Woodard | 29/494 |
| 3,981,429 | A | 9/1976 | Parker | 228/194 |
| 4,009,027 | A | 2/1977 | Naidich et al. | 75/154 |
| 4,026,677 | A | 5/1977 | Galasso et al. | 428/649 |
| 4,029,479 | A | 6/1977 | Parker | 428/660 |
| 4,034,454 | A | 7/1977 | Galasso et al. | 428/576 |
| 4,448,605 | A | 5/1984 | Mizuhara | 75/123 H |
| 4,448,853 | A | 5/1984 | Fischer et al. | 428/607 |
| 4,586,964 | A | 5/1986 | Finnegan et al. | 148/11.5 A |
| 4,606,981 | A | 8/1986 | Mizuhara | 428/606 |
| 4,612,259 | A | 9/1986 | Ueda | 428/661 |
| 4,706,872 | A | 11/1987 | Norris | 228/194 |

(Continued)

FOREIGN PATENT DOCUMENTS

EP      456481      11/1991

(Continued)

*Primary Examiner*—Gwendolyn Blackwell
(74) *Attorney, Agent, or Firm*—Smith, Gambrell & Russell

(57) ABSTRACT

A method for producing titanium alloy brazing strips and the resulting brazing strips and/or foils. The method uses a cold-rolling process without heat treating to generate a titanium based multi-layer alloy strip or foil made up of discrete layers of titanium and an additional layer or layers of one or more metals, such as zirconium, nickel and/or copper, for example, or alloys thereof, with the layer of titanium roll bonded without heat treating to the layers of the additional metal(s). The resulting strip or foil can include, for example, Cu/Ti/Cu, Ni/Ti/Ni, Ni/Ti/Cu, Cu/Ni/Ti/Ni/Cu, Ni/Cu/Ti/Cu/Ni, Ni/Cu/Ni/Ti/Ni/Cu/Ni, Ni/Zr/Cu/Ti/Cu/Zr/Ni and Ni/Ti/Cu/Zr/Cu/Ti/Ni among other combinations. The resulting strip or foil can be used for brazing, creating an alloy of the weight percentage of the original materials.

4 Claims, 4 Drawing Sheets

U.S. PATENT DOCUMENTS

| | | | |
|---|---|---|---|
| 4,725,509 A | 2/1988 | Ryan | 428/607 |
| 4,780,374 A | 10/1988 | Mizuhara | 428/660 |
| 4,871,622 A | 10/1989 | Rabinkin | 428/576 |
| 5,028,495 A | 7/1991 | Hirano et al. | 428/622 |
| 5,082,161 A | 1/1992 | Utida et al. | 228/122 |
| 5,222,282 A | 6/1993 | Sukonnik et al. | 29/17.9 |
| 5,489,411 A | 2/1996 | Jha et al. | 419/3 |
| 5,553,770 A | 9/1996 | Jha et al. | 228/190 |
| 5,686,190 A | 11/1997 | Mennucci et al. | 428/472 |
| 5,761,799 A | 6/1998 | Mennucci | 29/825 |
| 6,022,426 A | 2/2000 | Mennucci et al. | 148/527 |
| 6,143,241 A | 11/2000 | Hajaligol et al. | 419/31 |
| 6,294,130 B1 | 9/2001 | Hajaligol et al. | 419/31 |
| 6,475,637 B1 | 11/2002 | Strutt et al. | 429/23.3 |

FOREIGN PATENT DOCUMENTS

| | | | |
|---|---|---|---|
| EP | 0 671 240 | | 9/1995 |
| EP | 1 199 129 | | 4/2002 |
| JP | 04-6173 | * | 1/1992 |
| JP | 04-006713 | * | 1/1992 |

* cited by examiner

TI BRAZING STRIPS OR FOILS

This application is a continuation-in-part of U.S. Utility patent application Ser. No. 10/320,068 filed Dec. 16, 2002, now U.S. Pat. No. 6,722,002, which is incorporated herein by reference.

BACKGROUND OF THE INVENTION

The present invention relates generally to a method for producing titanium alloy brazing strips and the resulting brazing strips or foils. More particularly, the invention relates to: a titanium based multi-layer alloy strip or foil made up of discrete layers of titanium and an additional metal or metals, such as nickel or nickel alloys and/or copper or copper alloys, for example; a titanium based multi-layer alloy strip or foil made up of discrete layers of titanium, zirconium and an additional metal or metals, such as nickel or nickel alloys and/or copper or copper alloys, for example; and a method for using a cold-rolling process to generate a titanium based multi-layer alloy strip or foil made up of discrete layers of titanium, zirconium and/or additional metal or metals, such as nickel and/or copper, for example.

Brazing alloys based on titanium (Ti) are useful for brazing components that consist of titanium, nickel (Ni) and/or iron/steel (Fe) based elements or alloys, among other uses. Thin gauge brazing strips or foils have proven useful for filling braze joints, and/or for providing suitable substrate materials to form self-brazing bonds and/or for vacuum brazing. The lower melting points of common Ti-based brazing alloys cause a beneficial minimum effect on the microstructures and mechanical properties of the brazed components. Furthermore, Ti-based brazing alloys tend to provide corrosion resistance that is superior to conventional copper (Cu) or silver (Ag) based brazing alloys. A roll bonding process is useful for allowing desirable brazing alloys to be produced in continuous coil form in thin gauge. The availability of these Ti-based brazing alloys in thin foil gauge and in continuous coil lengths has been difficult to achieve, as these alloys tend to be brittle and render the conventional cold working process difficult to utilize. Cold rolling titanium typically results in a brittle metal. Thus, a means for obtaining Ti based brazing alloys and/or compounds and/or laminates in a foil form using conventional cold working techniques would be useful.

Beta Ti alloys with a body-centered-cubic crystalline structure are stabilized by the addition of beta stabilizers such as molybdenum (Mo), Zr, Ni, or Nb to Ti. These alloys show superior formability than the conventional alpha or alpha-beta Ti alloys. Beta Ti alloys can be cold rolled to thin gauge and formed into complex parts such as the fins in a honeycomb structure. Brazing is the favored joining method to provide structure integrity and ease of manufacturing. However, Ti alloy, with its highly reactive nature, readily forms stable scales that prevent conventional brazing alloys from wetting the surface. Ti-15Ni-15Cu type brazing alloy was developed as the brazing alloy of choice for Ti alloys, such as in British patent no 1141247, for example, incorporated herein by reference.

Ti alloys suffer the beta transus phenomenon that results in an undesirable microstructure after a brazing cycle. The beta transus of Ti alloys refers to the temperature at which Ti undergoes phase transformation (alpha to beta or vice versa) and results in crystal structure changes. In the beta type Ti alloys, the alpha phase tends to precipitate at the beta grain boundary at a temperature above the beta transus, which causes embrittlement that is detrimental to the ductility and fatigue resistance of the materials. The brazing temperature has to be kept as low as possible and holding time has to be minimized as well as to avoid the aforementioned embrittlement. This disclosure describes brazing alloys of Ti—Cu—Ni and also Ti—Cu—Ni with zirconium (Zr) addition to reduce the melting (brazing) temperatures significantly below that of the Ti-15Cu-15Ni brazing alloys.

In the arrangement of the components of a multi-layered brazing alloy, it would often be useful to have the Ti or Zr layer in the middle. The advantages of having the Ti or Zr layer in the middle would be the resulting uniform relative thickness of the Cu/Ni, Ni/Cu/Ni or Ni/Zr/Cu layers to the middle Ti layer or the Ni/Ti/Cu layers to the middle Zr layer as well as the homogenous deformation of the composite during the cold reduction. These advantages are often important to provide uniform chemistry and thin finish thickness for brazing shim application.

This is in contrast to the Ti/Cu—Ni/Ti arrangement cited in the U.S. Pat. No. 3,652,237 (incorporated herein by reference). In that patent, the Ti layers are on the outside of the relatively soft Ni—Cu layer. The Ti layers are hermetically welded to form an envelope to sandwich the Ni—Cu layer. A few drawbacks can result from this arrangement. The exposed, reactive Ti layers may not permit the heat treating of the composites, because it is conducted in air or hydrogen or nitrogen as Ti reacts and forms easily Ti oxide, hydride and nitride with the respective heat treating atmospheres. This leaves the heat treating typically only feasible in a vacuum, which is typically not a process that can be performed in a continuous, strip-annealing manner. The hard Ti layers on top of the soft middle Ni—Cu layer can also introduce non-uniform deformation of the softer middle layer. The non-uniform deformation of a center soft layer can affect the local alloy chemistry by deviating from the intended composition required by the brazing. This type of localized, non-uniform deformation of the center layer can also post a limit on the minimum thickness that strip can reach before the local asperity leads to a fracture of the materials.

It would be useful to have a strongly adherent, multi-layered composite produced by a roll bonding process avoiding some or all of the above problems. The roll bonding process has a few advantages over the other approaches such as plating or hot bonding. It would be advantageous to utilize a roll bonding process to provide a large reduction in thickness (such as greater than 60%, for example) during the bonding of the components in the brazing alloy. The large reduction, by breaking up the surface scale, would allow a true metallurgical bond to form between the dissimilar materials. Because the temperature of roll bonding process can be advantageously low, there is little concern of possible alloy diffusion or scale formation, especially if heat treating steps can be avoided. The bond integrity could allow the composite to be processed to the desirable thickness, preferably without any intermediate heat treating to soften the materials. However, using a Cu—Ni alloy, especially in a near-equal weight percent condition, typically results in significant hardening if utilized in a cold rolling process, and thus requires intermediate heat treating steps to get to a sufficiently thin gage. A process that does not require the heat treating step could provide savings in time and money.

Furthermore, intermediate heat treating is often not desirable because brittle compounds between the constituent layers might form and render any further cold reduction difficult or even impossible. One advantage of a roll bonding process is to allow the strips to be bonded at heavy thickness, followed by the conventional cold reduction process, and thus providing a higher throughput than another process such as plating. Furthermore, the roll bonding process allows the adjustment of the relative thickness of individual constituents in order to tailor the chemical composition of brazing alloys. In addition, eliminating any heat treating processes simplifies the manufacturing process and reduces energy costs. Consequently, providing a means for using a cold rolling process without heat treating to generate the desired Ti alloy thin sheets and foils for brazing would be beneficial.

The addition of Zr to the Ti—Cu—Ni brazing alloy would allow melting (brazing) to occur at lower temperatures than does a Ti—Cu—Ni brazing alloy without Zr. The lowered brazing temperature results in reduced undesirable microstructure changes in the brazed parts after brazing. Reduced microstructure changes cause less embrittlement of the brazed parts. Because embrittlement is detrimental to the ductility and fatigue resistance of the brazed parts, the use of a Ti—Cu—Ni brazing alloy with added Zr, and the concomitant lowered brazing temperature, would result in brazed materials with better mechanical properties than would otherwise be obtained using a Ti—Cu—Ni brazing alloy without added Zr. The addition of Zr to the Ti—Cu—Ni system has only been reported by the mixed powders (see EU patent 0456481A2, incorporated herein by reference) and rapid solidification produced thin foil (see U.S. Pat. No. 6,475,637, incorporated herein by reference). The rapid solidified foil is limited in the width and quantity, while the powders suffer the risk of the contamination that prevents uniform wetting of the base materials. Therefore, it would be beneficial to provide a means for using a cold rolling process to generate the desired brazing foils and sheets made of an alloy of Ti, Zr, and other metals.

SUMMARY OF THE INVENTION

Provided is a brazing strip or foil comprising a first metallic layer, a second metallic layer, and a core. The core includes one or both of titanium and zirconium sandwiched between the first and the second metallic layers. The core has a metallic bond with the first and the second metallic layers formed by roll bonding the core with the layers without any intermediate heat treating.

Also provided is a brazing strip or foil comprising a first layer including one of commercially pure copper, a copper alloy, commercially pure nickel, and a nickel alloy; a second layer including one of commercially pure copper, a copper alloy, commercially pure nickel, and a nickel alloy; and a titanium layer including one of commercially pure titanium, and a titanium alloy sandwiched between the first and the second layers. The titanium layer has a metallic bond with the first and the second layers formed by roll bonding the layers together without any intermediate heat treating.

Further provided is a brazing strip or foil comprising: a first layer including one of commercially pure copper, a copper alloy, commercially pure nickel, and a nickel alloy; a second layer including one of commercially pure copper, a copper alloy, commercially pure nickel, and a nickel alloy; and a zirconium layer including one of commercially pure zirconium, and a zirconium alloy sandwiched between the first and the second layers. The zirconium layer has a metallic bond with the first and the second layers formed by roll bonding the layers without any intermediate heat treating.

Also provided is a seven layer brazing strip or foil comprising: a titanium layer including one of commercially pure titanium and a titanium alloy sandwiched between a pair of strips or foils each as defined in the above paragraph, wherein the titanium layer has a metallic bond with one surface of each of the pair of strips or foils.

Still further provided is the brazing strip or foil of the above paragraph, wherein the metallic bond with the titanium layer is formed by roll bonding without any intermediate heat treating.

Still further provided is a brazing strip or foil comprising: a first metallic layer; a second metallic layer; a third metallic layer; a fourth metallic layer, and a titanium layer including one of titanium and a titanium alloy. The first and the second layers are layered on one side of the titanium layer, and the third and the fourth layers are layered on another side of the titanium layer.

Also provided is a brazing strip or foil comprising: a first layer including one of copper and a copper alloy; a second layer including one of nickel and a nickel alloy; a third layer including one of nickel and a nickel alloy; a fourth layer including one of copper and a copper alloy; and a titanium layer of one of commercially pure titanium and a titanium alloy.

The first and the second layers are layered on one side of the titanium layer, and the third and the fourth layers are layered on another side of the titanium layer. The titanium layer has a metallic bond with at least one of the first, the second, the third, and the fourth layers, the metallic bond being formed by roll bonding without intermediate heat treating.

And provided is a brazing strip or foil comprising: a core including of one or more of titanium and zirconium; and at least one covering layer of one of commercially pure copper, a copper alloy, commercially pure nickel, and a nickel alloy. The covering layer substantially covers the core, wherein the covering layer has a metallic bond with the core formed by roll bonding without heat treating.

Additionally provided is a brazing strip or foil comprising: six metallic layers, and a core including one or both of titanium and zirconium, where the three layers are layered on one side of the core, and three layers are layered on another side of the core.

Still further provided is the brazing strip or foil of the above paragraph wherein some of the metallic layers include one or more of copper, nickel, and zirconium and wherein the layers form metallic bonds between each other and the core.

And still further provided is the brazing strip or foil of the above two paragraphs wherein the metallic bonds are formed without any heat treating steps.

Further provided are a number of methods of making the above strips or foils, including, but not limited to:

A method of making a seven layer composite strip comprising the steps of: providing a first strip including one or both of nickel and copper; providing a second strip including one or both of zirconium and titanium; and providing a third strip including one or both of nickel or copper.

A step of first roll bonding the first strip, the second strip and the third strip together to form a metallic bond between the first strip and the second strip and to form a metallic bond between the second strip and the third strip is provided.

Further, a core strip including one or both of titanium and zirconium is provided, and a step of second roll bonding the core strip with a layer of the outer composite strip on each side of the titanium strip to form a metallic bond between the core and each of the outer composite strips to thereby form a seven layer composite strip is done.

Another method of making a seven layer brazing strip or foil is provided, with the steps of: providing a first strip including one of nickel and copper; providing a second strip including one or both of zirconium and titanium; and providing a third strip including the other of nickel or copper.

A step of first roll bonding the first strip, the second strip and the third strip together to form a metallic bond between the first strip and the second strip and to form a metallic bond between the second strip and the third strip to thereby form a bonded composite strip is accomplished.

A step of first reducing a total thickness of the bonded composite strip to form an outer composite strip is also accomplished.

A core strip including titanium is provided, and a step of second roll bonding the titanium strip with a layer of the outer composite strip on each side of the titanium strip to form a metallic bond between the core and each of the outer composite strips to thereby form a seven layer composite strip is also accomplished.

A second reducing step is done to reduce a total thickness of the seven layer composite strip to form a seven layer brazing strip or foil.

Another method of making a seven layer brazing strip or foil includes the steps of: providing a first strip including commercially pure copper; providing a second strip including zirconium; and providing a third strip including commercially pure nickel.

A step of first roll bonding the first strip, the second strip and the third strip together to form a metallic bond between the first strip and the second strip and to form a metallic bond between the second strip and the third strip to thereby form a bonded composite strip is done.

A core strip including titanium is also provided, and a step of second roll bonding the titanium strip with a layer of the outer composite strip on each side of the titanium strip to form a metallic bond between the core and each of the outer composite strips to thereby form a seven layer composite strip.

A step of reducing a total thickness of one or both of the bonded composite strip and the seven layer composite strip without any intermediate heat treating steps is also used to thereby form a seven layer brazing strip or foil.

Finally, a method of making a brazing strip or foil comprising the steps of providing six layers, including a first layer of commercially pure copper; a second layer including one or both of zirconium and titanium; a third layer of commercially pure nickel; a fourth layer of commercially pure nickel; a fifth layer including one or both of zirconium and titanium; and a sixth layer of commercially pure copper.

A step of processing all layers with a core strip including titanium to metallurgically bond the first, second and third layers together and to bond one of the first, second, and third layers to one side of the core strip and to also metallurgically bond the third, fourth and fifth layers together and to bond one of the fourth, fifth, and sixth layers to another side of the core strip.

Further, a step of processing one or more of the layers by rolling to reduce a total thickness, resulting in a metallurgically bonded, multi-layered brazing strip or foil is accomplished.

DETAILED DESCRIPTION OF THE PREFERRED EMBODIMENTS

This invention relates to multi-layer composite strips and/or foils useful in brazing. A "foil" is known in the art to be of a thickness less than a strip, and the common definition of "foil" is a "very thin sheet metal". As used herein, a foil is taken to be less than 5 mil, and thus the term "strip" is used to designate situations where the thickness is greater than 5 mil.

To summarize the invention, commercially pure, or nearly pure, Ti, Cu or Cu alloy, and/or Ni or Ni alloy strips, with the proper thickness, are roll bonded together by a process to form multi-layer composite strips and/or foils useful in brazing. Also, commercially pure, or nearly pure, Ti and Zr strips with proper thickness are roll bonded to commercially pure, or nearly pure, Cu or Cu alloy and/or Ni or Ni alloy strips with proper thickness to form multi-layer composite strips and/or foils useful in brazing. The thickness of each component is selected so that the weight percent of each component matches that of the desired composition of the brazing alloy.

The layers are preferably roll bonded together without heat treating (e.g., without annealing or sintering), resulting in a different metallurgical bond than would occur with one or more heat treating steps. The thickness of each component is selected so that the weight percent of each component matches that of the desired composition of the brazing alloy. The ductile nature of the multi-layer strips also allow additional conventional metal working methods to be utilized, if desired such methods including one or more of additional cold-working, rolling, heat treating, cleaning and/or slitting, for example, if desired.

The strips can also be formed by roll bonding two or three layers of metallic strips (typically containing one or more of copper, nickel, and zirconium) to form an outer composite layer with metallurgical bonds between the layers, which may be further rolled to reduce thickness and form a thin outer composite strip. The outer composite layer/strip is then put on both sides of a core metallic strip (typically titanium), and further roll bonded to form a five or seven layer composite, that can also be thickness reduced by further rolling, to form a thin strip or foil. This can be done without any intermediate heat treating.

Figure 1:
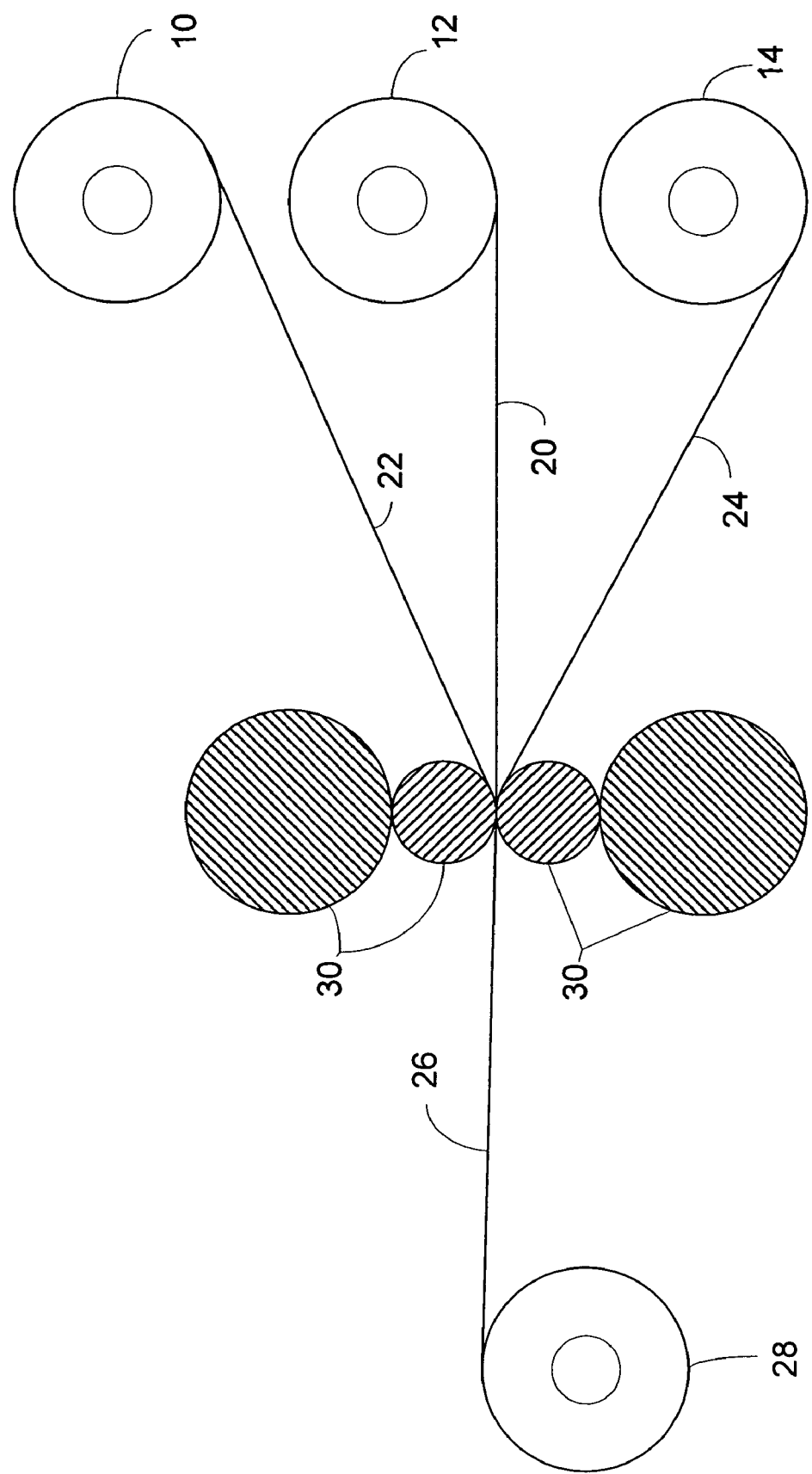
FIG. 1 is a block diagram showing a bonding mill, such as might be utilized to process the brazing strip.

Roll bonding is typically carried out in a bonding mill that provides sufficient pressure to form a metallurgical bond even without heat treating (such as annealing, for example) between the dissimilar materials. A schematic of an example bonding operation is shown in FIG. 1, with the Ti or Zr strip 20 being taken off a roll 12 of Ti or Zr, a first strip 22 of Cu, Ni, or an alloy thereof, or a multilayer composite comprising Cu, Ni, or an alloy thereof and Ti or Zr being taken from a roll 10, and a second strip 24 of Cu, Ni, or an alloy thereof, or a multilayer composite comprising Cu, Ni, or an alloy thereof and Ti or Zr being taken from a roll 14. The first strip 22 may comprise the same metal as the second strip 24 (both Cu or both Ni, or an alloy thereof), or they may be comprised of different metals (one Cu and one Ni, for example, or each of a different alloy composition of Cu and Ni, for example), depending on the desired configuration of the brazing strip and/or the desired brazing alloy. The strips are typically processed through a rolling mill using rolls 30, resulting in the multi-layered brazing strip or foil 26, which is then taken up on a roll 28.

Figure 2:
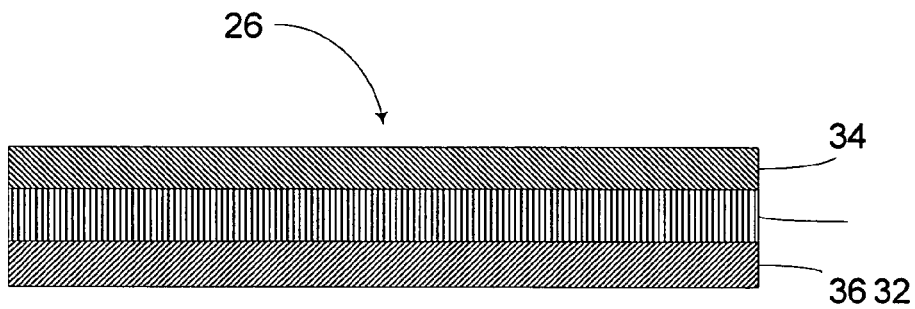
FIG. 2 is a block diagram showing a first example of a brazing strip or foil produced according to the invention.

FIG. 2 shows a close up of an end or side view of an example of the resulting brazing strip or foil 26 output by the bonding operation shown in FIG. 1, with the layer 32 being of Ti or Zr, the layer 34 being either Cu, Ni, or an alloy thereof, according to the composition of strip 22, and the layer 36 being either Ni, Cu, or an alloy thereof according to the composition of strip 24. This could result in composites of the form Ni/Zr/Ni; Ni/Ti/Ni; Cu/Ti/Cu; Cu/Zr/Cu; Cu/Ti/Ni; and Cu/Zr/Ni, for example.

Figure 3:
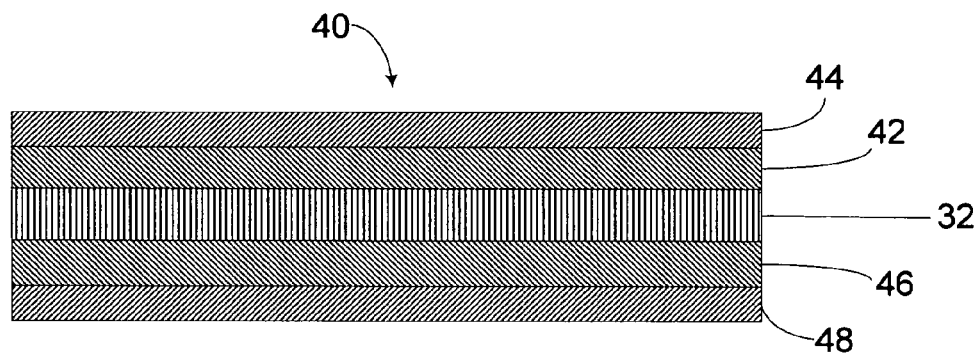
FIG. 3 is a block diagram showing a second example of a brazing strip or foil produced according to the invention.

FIG. 3 shows an additional example of a brazing strip or foil 40 that could be processed according to the invention, of which the strips could be arranged in the manner Cu/Ni/Ti/Ni/Cu, for example, such that layer 44 is Cu, layer 42 is Ni, layer 32 is Ti, layer 46 is Ni, and layer 48 is Cu. However, the placements of the strips can vary in order and/or composition as desired during manufacture, resulting in a number of possible combinations of layers, including but not limited to, Ni/Cu/Ti/Cu/Ni, or various alloys thereof, as an additional example. Multiple strips of Ti could also be utilized, if desired, and Zr might be substituted for Ti (or for some other layer or layers) for some applications.

Figure 4:
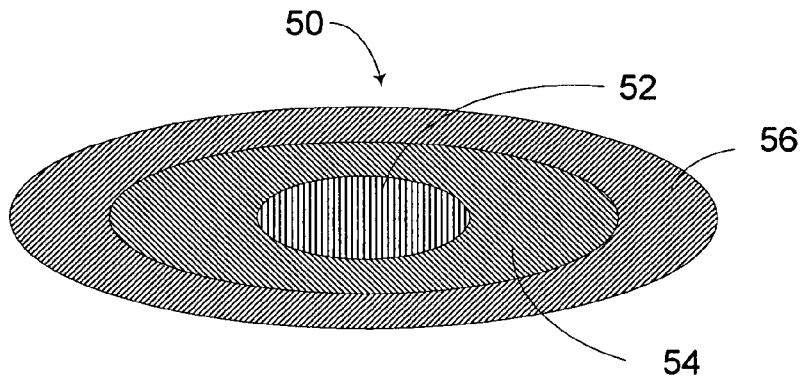
FIG. 4 is a block diagram showing a third example of a brazing strip or foil produced according to the invention.

FIG. 4 shows a still different example of a brazing strip or foil 50 with a titanium core 52 coated with a covering layer 54 completely covering the titanium core, and an additional covering layer 56 completely covering the covering layer. The covering layers will preferably be one or more of copper, a copper alloy, nickel, and a nickel alloy. The titanium core could be a titanium or titanium alloy rod, wire or strip of circular, rectangular, or oval cross section, for example. Alternatively, the covering layer could merely substantially cover the core (not shown), while the additional covering layer could merely substantially cover the covering layer and/or an uncovered portion of the titanium core, such that a majority of the titanium core is ultimately covered, protecting the core from scaling and/or corrosion, and for aiding in the cold-working process.

Figure 5:
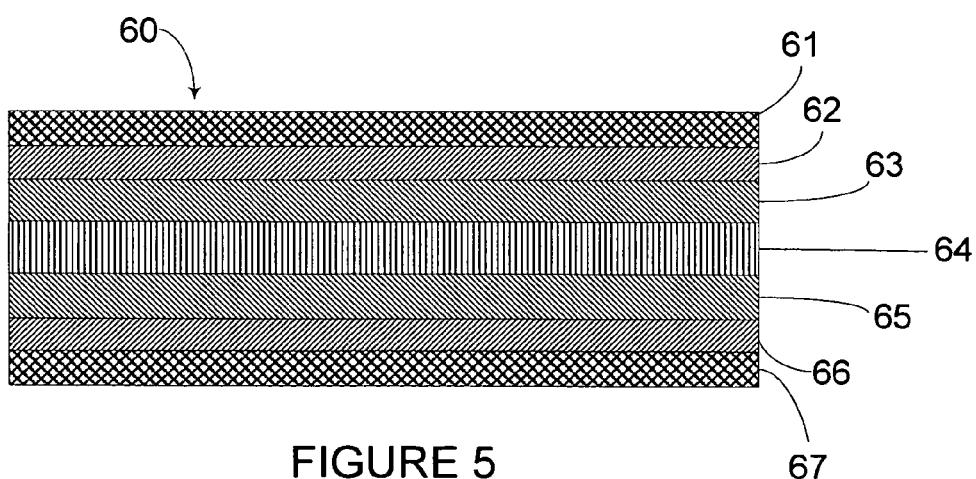
FIG. 5 is a block diagram showing a fourth example of a brazing strip or foil produced according to the invention.

FIG. 5 shows an example of a brazing strip or foil 60 that could be processed according to the invention, of which the strips could be arranged in the manner Ni/Cu/Ni/Ti/Ni/Cu/Ni, for example, such that layers 61, 63, 65, and 67 are Ni, layers 62 and 66 are Cu, and layer 64 is Ti. However, the placements of the strips can vary in order and/or composition as desired during manufacture, resulting in a number of possible combinations of layers, including but not limited to, Cu/Ni/Cu/Ti/Cu/Ni/Cu, or various alloys thereof, as an additional example. Multiple strips of Ti could also be utilized, if desired, and Zr could be substituted for Ti (or some other layer or layers) for some applications.

FIG. 5 also shows an example of a brazing strip or foil 60 that could be processed according to the invention, of which the strips could be arranged in the manner Ni/Zr/Cu/Ti/Cu/Zr/Ni, for example, such that layers 61, and 67 are Ni, layers 62 and 66 are Zr, layers 63 and 65 are Cu, and layer 64 is Ti. However, the placements of the strips can vary in order and/or composition as desired during manufacture, resulting in a number of possible combinations of layers, including but not limited to, Ni/Ti/Cu/Zr/Cu/Ti/Ni, Cu/Zr/Ni/Ti/Ni/Zr/Cu, Cu/Ti/Ni/Zr/Ni/Zr/Cu, or various alloys thereof, as an additional example. Multiple strips of Ti or Zr could also be utilized, if desired.

In one embodiment, the process involves taking an individual strip, or multiple strips, of Ti, with a strip, or multiple strips, comprised of elemental Cu and/or Ni, alloys thereof, or combinations thereof, placed on one, or both, sides of the Ti strip. Optionally, one or more multi-layered, bonded or unbonded (individual), Cu/Ni strip(s), or alloys thereof, may be placed next to, or on either side of, the Ti strip when multiple layers of those metals are desired. The thus-placed strips are then processed, such as being cold-worked by processing with a rolling machine, for example, to the desired thickness, resulting in a roll bonded, multi-layered alloy strip or foil useful for various brazing applications.

Other methods of forming the multi-layered brazing strips or foils could also include starting with a core of titanium or titanium alloy, coating the core (using coating methods known in metallurgy practice) with at least one or more layers of one or more of copper, a copper alloy, nickel, and a nickel alloy. The resulting multi-layered composite could then be cold-worked to the desired thickness to a thin strip or foil as described herein.

An alternative process for making brazing foils with Zr and/or Ti involves taking an individual strip, or multiple strips, of Zr with a strip, or multiple strips, comprised of elemental Cu and/or Ni, alloys thereof; or combinations thereof, placed on both, sides of the Zr strip. The thus-placed strips are then processed, such as being cold-worked by processing with a rolling machine, for example, to the desired thickness, resulting in a roll bonded, multi-layered alloy strip. An individual strip of the multi-layered alloy strip is then placed next to, and on both sides of, an individual strip, or multiple strips, of Ti. The thus-placed strips are then processed, such as being cold-worked by processing with a rolling machine, for example, to the desired thickness, resulting in a roll bonded, multi-layered alloy strip or foil useful for various brazing applications.

Alternatively, the process for making brazing foils with or without Zr involves taking an individual strip, or multiple strips, of Ti or Zr with a strip, or multiple strips, comprised of elemental Cu and/or Ni, alloys thereof, or combinations thereof, placed on both, sides of the Ti or Zr strip. The thus-placed strips are then processed, such as being cold-worked by processing with a rolling machine, for example, to the desired thickness, resulting in a roll bonded, multi-layered alloy strip. Multi-layer strips previously formed by this process (including, for example, composite strips of the form Cu/Zr/Cu; Cu/Ni, Cu/Ti/Cu; Cu/Zr/Ni; Cu/Ti/Ni; among others); can be used to sandwich additional layers of Zr and/or Ti (or other multi-layer strips) to form strips having 5, 6, 7, or more layers. Thus, an individual strip of the multi-layered alloy strip is placed next to, and on both sides of, an individual strip, or multiple strips, of Ti or Zr (or some other layer or multi-layer strip). The thus-placed strips are then processed according to this invention, such as being cold-worked by processing with a rolling machine, for example, to the desired thickness, resulting in a roll bonded, multi-layered alloy strip or foil useful for various brazing applications.

Other methods of forming the multi-layered brazing strips or foils with Zr added could also include starting with a core of Ti or Ti alloy, coating the core (using coating methods known in metallurgy practice) with at least one or more layers of one or more of Cu, a Cu alloy, Ni, or a Ni alloy. Further coating that multi-layer system with at least one or more layers of Zr, with or without intermediate cold-working steps. Further coating the resulting multi-layer system with at least one or more layers of one or more of Cu, a Cu alloy, Ni, or a Ni alloy, with or without intermediate cold-working steps. The resulting multi-layered composite could then be cold-worked to the desired thickness to a thin strip or foil as described herein.

Similarly, other methods of forming the multi-layered brazing strips or foils with Zr added could also include starting with a core of Zr or Zr alloy, coating the core (using coating methods known in metallurgy practice) with at least one or more layers of one or more of Cu, a Cu alloy, Ni, or a Ni alloy. Further coating that multi-layer system with at least one or more layers of Ti, with or without intermediate cold-working steps. Further coating the resulting multi-layer system with at least one or more layers of one or more of Cu, a Cu alloy, Ni, or a Ni alloy, with or without intermediate cold-working steps. The resulting multi-layered composite could then be cold-worked to the desired thickness to a thin strip or foil as described herein.

Specifically, this invention applies the cold roll bonding process preferably without heat treating to produce multi-layer brazing strips or foils consisting of strips of Ti with another metal, such as Ni and/or Cu, or, alternatively, strips or foils consisting of strips of Ti with Zr and other metals such as Ni and/or Cu, useful, for example, for brazing components that consist of titanium, nickel (Ni) or iron (Fe) based elements or alloys, among other uses. The brazing process results in an alloy of composition according to the weight-percentage of the individual strips having a differently formed metallic bond and/or crystalline structure than if heat treating (such as annealing) had been used. Thin gauge brazing strips and/or foils have proven useful for filling braze joints, or, when roll bonded to suitable substrate materials to form self-brazing materials for vacuum brazing.

In one embodiment, the general process starts with commercially pure, or nearly pure Cu and/or Ni strips (or alloys thereof). These strips, with the proper thickness (according to the desired weight-percentage), are then roll bonded together without heat treating by the process described hereinbelow to form multi-layer composite strips and/or foils useful in brazing.

In another embodiment, a multi-layered composite of Cu and/or Ni (or alloys thereof) is placed on either side of commercially pure, or nearly pure, Ti strip or strips. The thus placed strips are then roll bonded together without heat treating by the process described herein below.

In embodiments containing Zr, the general process starts with commercially pure, or nearly pure Cu and/or Ni strips (or alloys thereof). These strips, with the proper thickness (according to the desired weight-percentage), are then placed on either side of either commercially pure, or nearly pure, Zr or Ti strips. The thus placed strips are then roll bonded together without heat treating by the process described herein below, and as shown in FIG. 1, to form a multi-layered composite. The multi-layered composite is then placed on either side of either commercially pure, or nearly pure, Zr or Ti, whichever element is not present in the multi-layered composite. The thus placed strips are then roll bonded together without heat treating by the process described herein below as shown in FIG. 1, to form a seven layered strip or foil as shown in FIG. 5.

Figure 6:
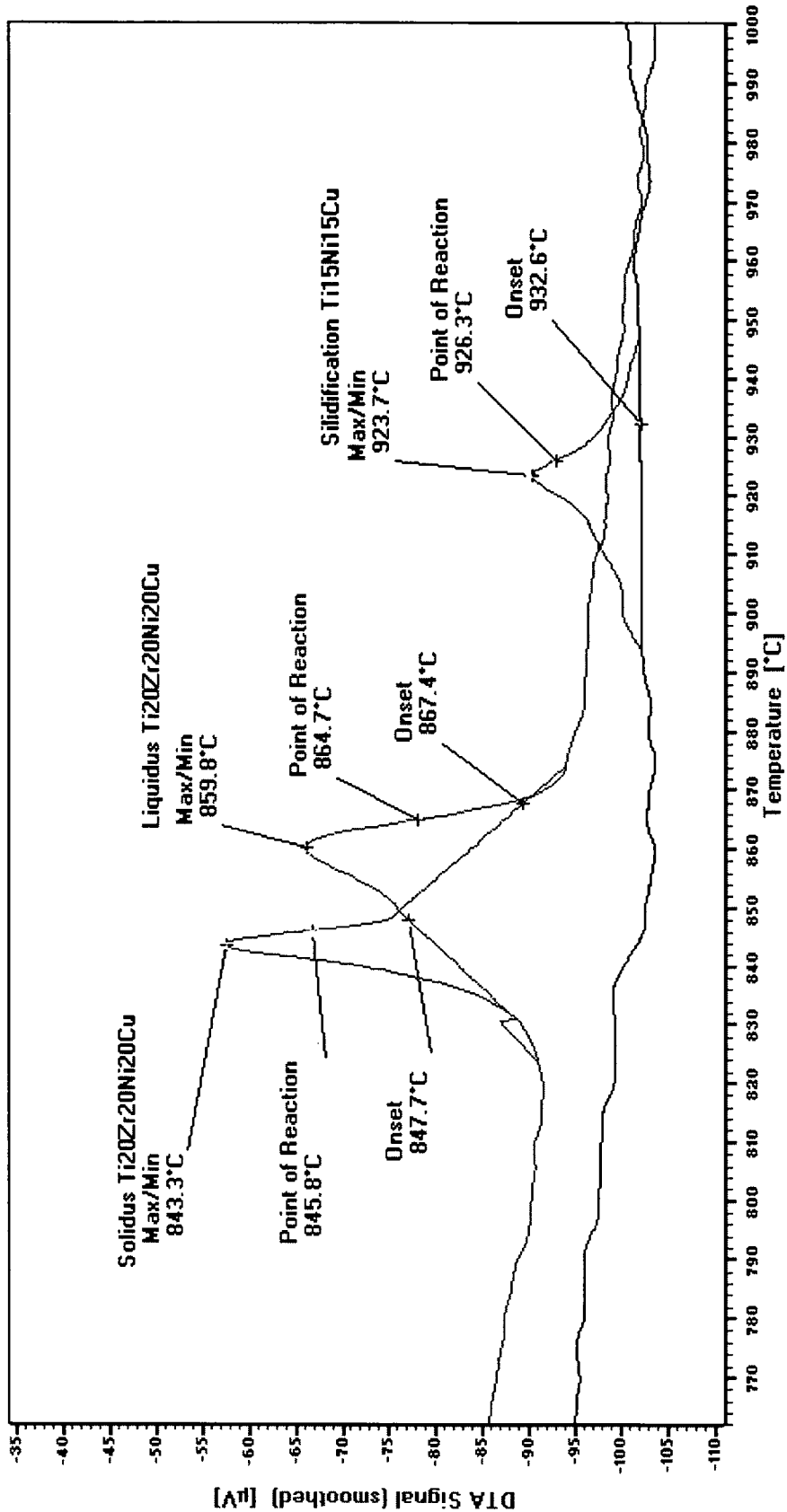
FIG. 6 shows DTA cooling curves for Ti-20Zr-20Ni-20Cu and Ti-15Ni-15Cu.
Figure 7:
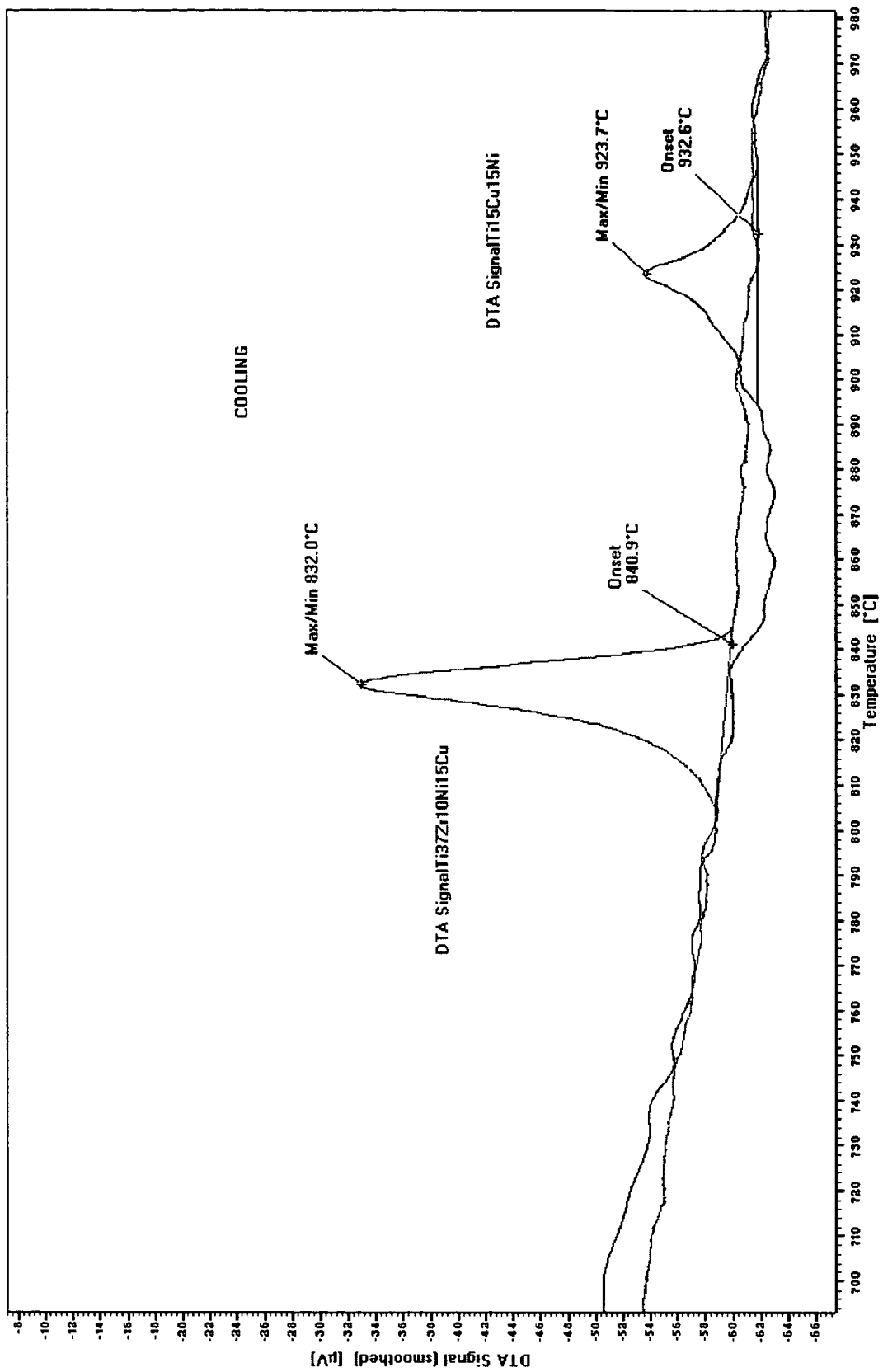
FIG. 7 shows DTA cooling curves for Ti-37Zr-10Ni-15Cu and Ti-15Ni-15Cu.

FIGS. 6 and 7 show DTA cooling curves for Ti-20Zr-20Ni-20Cu and Ti-15Ni-15Cu and DTA cooling curves for Ti-37Zr-10Ni-15Cu and Ti-15Ni-15Cu, respectively.

The bond integrity of the thus obtained metallurgical roll bond (without annealing) allows the cold reduction, such as rolling, to be carried out without any substantial separation between the layers. The cold reduction required can be substantial in order to reach the desired thickness (e.g. 0.002 inch is typical) commonly used for the brazing applications. The process can be used for various thicknesses across a wide range according to the desired uses of the resulting brazing strip or foil. Total reduction, including bonding, can be greater than 90%, with reduction during the bonding greater than 60%, for example. The multi-layer composite can thus be used to replace conventional brazing shims. Furthermore, this multi-layer composite can be roll bonded to the desirable alloy strips (e.g. Ti) to form self-brazing materials which completely eliminate the need for separate brazing shims.

The brazing alloys according to this invention are useful for brazing components comprising or consisting of Ti, Ni or Fe based alloys, among other uses. The lower melting points of these Ti-based brazing alloys can be useful in reducing the effect of heat on the microstructures and mechanical properties of the brazed components. Furthermore, the brazing strips or foils according to the invention provide corrosion resistance that is often superior to the conventional Cu or Ag-based brazing alloys.

The addition of Zr to a Ti/Cu/Ni brazing alloy results in a lower melting (brazing) temperature. Furthermore, the layering arrangement of metals in the roll bonded strips and/or foils can be ordered in such a way that the reactive components, Ti and Zr, will not be exposed during the temperature ramping state of the brazing process. The roll bonding process allows the brazing alloys, strips and/or foils to be produced in continuous coil form in thin gauge, improving handling characteristics. The availability of these Ti-based brazing alloys in thin foil gauge and in continuous coil length has been difficult to achieve in the past, as the traditional alloys have been extremely brittle and render conventional cold working process difficult.

The four components, Cu, Ni, Zr and Ti, (or two components, Ni and Ti or Cu and Ti, or three components, Ni, Cu, and Ti or Ni, Cu and Zr, for example) which make up the constituents of the brazing alloys can be arranged in any sequence. However, the preferred arrangement three and five layered foils is to place one Ti layer in the middle, for most applications, although other arrangements may be useful in specific circumstances (including the addition of additional Ti layers, preferably not outside layers). The preferred arrangements for seven layered strips and/or foils are Ni/Cu/Ni/Ti/Ni/Cu/Ni, Ni/Zr/Cu/Ti/Cu/Zr/Ni and Ni/Ti/Cu/Zr/Cu/Ti/Ni. By putting Ni and/or Cu as the outside layers, scale formation can be reduced or eliminated, and easily cleanable surfaces can result, which are often useful to form quality braze joints.

The Cu, Ni, Zr, and/or Ti may be commercially pure elements, or alloys of those elements, depending on the desired properties of the resulting product. By controlling the thicknesses of the resulting various layers, brazing alloy strips and/or foils of different proportions can be obtained.

The thickness of Ti can be varied between 5 to 95% of the total thickness of the clad materials. The thickness ratios of Ti to the clad materials determine the alloy composition and consequently the melting point of the alloy. In a roll bonded, multi-layer composite (e.g. Ni/Cu/Ti/Cu/Ni), it is often beneficial for the Ti thickness ratio to be at about 82% of the total thickness so that the resulting alloy has a composition of 70% Ti, 15% Ni and 15% Cu (in weight percent). However, by adjusting the thickness of raw material prior to bonding, alloy chemistry can be readily adjusted.

A typical example of a useful brazing strip application is a 15Cu-15Ni-70Ti brazing alloy which is commercially used to braze Ti or Ti alloy components. The practice of producing the composite starts out with 0.030" thick CDA 102Cu, and 0.030" thick 201 Ni strips. The Cu and Ni strips are roll bonded and rolled to 0.0045" thick. The Cu/Ni strips are then roll bonded to both sides of a 0.040" thick commercial pure (CP) Ti, resulting in a five layer composite, such as shown in FIG. 3. The five layer composites of Cu/Ni/Ti/Ni/Cu can be rolled to a 0.002" thickness, for example, which is commonly employed for brazing applications. However, other thicknesses are easily achieved by varying the rolling process, as desired for specific applications.

Note that FIG. 4 shows an alternative to the five layer strip or foil of FIG. 3, literally having only three layers, but with a composition that can be made similar to the five layer strip or foil by using Cu as the outer layer, Ni as the middle layer, and Ti as the core, resulting a Cu/Ni/Ti strip or foil. Additional multi-layer composites can be created by extending these concepts to the desired number of layers.

Another example of a use for the brazing strips is the preparation of 15Cu-15Ni-70Ti brazing alloys. However, in this case, the five layer composite can be arranged in the manner of Ni/Cu/Ti/Cu/Ni. The step used to process the composite is the same as the previous example except the Cu/Ni layers were reversed during the bonding to the Ti layer.

A further example is the brazing alloy of the nominal composition of 33Ni—Ti. The Ni/Ti/Ni composite is typically produced with 0.005" thick 201Ni and 0.040" thick CP grade-2 Ti as the starting materials. Two 0.005" thick Ni strips are roll bonded to a 0.040" Ti strip. The roll bonded composite is cold rolled to 0.002". Again, other thicknesses are possible by varying the rolling process, and Cu could be substituted for the Ni, if desired.

The Ni/Ti/Ni composite can be roll bonded to suitable alloy strips to form self-brazing materials. Typical example is to roll bond 0.010" thick Ni/Ti/Ni strips to a 0.040" thick 316 stainless steel. The self braze strip is further cold rolled to 0.015" thick which has 20% thickness (0.003" thick) of brazing layers.

The resulting five layer composites, or other variations, can be placed between two sheets of 0.020" thick Beta-21 Ti alloys and placed in a vacuum furnace for brazing. The assembly is then heated to about 950° C. for about 10 minutes and cooled to ambient temperature. The resulting braze joint can be cross-sectioned and metallurgically shown to be sound between the Beta-21 alloys.

The five layer composites can also be cold rolled to 0.005" thick and rolled bonded to the one side of a 0.040" thick, Beta-21 alloy strip. The five layers, brazing alloy side of the thus produced self-brazing Beta-21 material are then placed in a vacuum furnace in contact with another 0.021" thick Beta-21 alloy. The brazing cycle was about 950° C. for about 10 minutes, for example. Braze joints examined for this process were found to be sound.

One of the useful features of this invention is the strongly adherent, multi-layered composites produced by the roll bonding process without heat treating. The roll bonding process has some common advantages over the other approaches (such as plating or hot bonding), such advantages, for example, as providing a large reduction (greater than 60%, for example) during the bonding of the components while avoiding the costs and other disadvantages of heat treating. The large reduction, by breaking up the surface scale, allows a true metallurgical bond to form between the dissimilar materials without heat treating.

Because the temperature of roll bonding process is typically low, there is little concern of possible alloy diffusion or scale formation. The bond integrity typically allows the composite to be processed to the desirable thickness without any intermediate heat treating to soften the materials, often reducing manufacturing steps and reducing energy usage, among other benefits. A possible advantage of the roll bonding process according to the invention is to allow the strips to be bonded at heavy thickness, followed by the conventional cold reduction process, and thus often providing a higher throughput than other conventional processes such as plating. Furthermore, the roll bonding process allows for the adjustment of relative thickness of individual constituents in order to tailor the chemical composition of brazing alloys.

There is typically no need to have intermediate heat treating steps because the soft to hard layers are built up sequentially, allowing the entire process to be cold worked without heat treating steps. Having the soft layer of Cu/Ni on the outside, the rolling is similar to a drawing operation, and the hard Ti can be squeezed thinner to a level that is not achievable when only Ti is being rolled. This has been found to be particularly true for the case of the Cu/Ni/Ti/Ni/Cu layered alloy, and even for the reverse case, because the Ni and Cu ratio is so close, that the small difference in the hardening between the Ni and Cu is of little significance. In contrast, a Cu—NI alloy, especially in the equal weight percent condition, might result in significant hardening due to cold rolling process, and would therefore require intermediate heat treating to get to a sufficiently thin gage. The process disclosed herein overcomes that difficulty.

The process can use commercially pure, "elemental" metals and/or alloys as the starting metals (i.e., the "strips" of FIG. 2). The advantage in using an "elemental" alloy such as pure Cu and Ni is that it is easily possible to vary the Cu to Ni ratio in an accurate way, and that commercially, specific alloys of Cu/Ni (such as a 50% Cu/Ni alloy) are often not available, while those that are available are often not acceptable for use in the intended applications. Using commercially pure alloys can provide great flexibility in the final product, as any ratio can be obtained merely by varying the thickness of the starting layers, meaning that the process is not limited by the alloy availability, because pure (or nearly pure) Cu and Ni alloys are typically readily available from many sources.

In the arrangement of the components of these multi-layered brazing alloys, it is often preferable to have the Ti somewhere in a middle layer. The advantages of having the Ti layer in the middle are the uniform relative thickness of the Cu/Ni to Ti as well as the homogenous deformation of the composite during the cold reduction. Further, the Ti is protected from scaling and/or corrosion. These advantages are important to provide uniform chemistry and thin finish thickness for brazing shim application.

The choice of the fraying faces on the multi-layer brazing alloys can be either Cu or Ni, or some combination thereof. However, there are several advantages of having the Cu layer as the fraying face, and thus the use of Cu as the fraying face layer is often preferable. This is because the melting point of the Ni—Ti eutectic is at about 942° C. while the Cu—Ti eutectic temperature is at about 855° C. When Cu is in contact with the Ti, the composite typically melts far ahead of the ternary alloy at 950° C. The early onsets of melting would likely cause uneven flow and wetting. Furthermore, in the vacuum brazing operation, the scale of Cu is far less stable than the nickel scale and thus the scale of Cu is less of a concern in preventing the wetting of Ti surfaces.

Example 1 of a seven layered foil is Ti-20Zr-20Ni-20Cu. Alloy strips of C102 Cu, N201 Ni, 702 Zr and Grade 2 CP-Ti are prepared by degreasing and wire brushing. C102 Cu and N 201 Ni strips at 0.015" thick are first roll bonded to 0.020" 702 Zr to a layered bond plate of Cu/Zr/Ni at 0.020" thick. The Cu/Zr/Ni bond plate is cold rolled to 0.017" thick (to form an outer composite layer). The Cu/Zr/Ni bond plates are degreased, wire brushed and followed by roll bonding to 0.040" CP-Ti to 0.030" thick (with the outer composite layer on each side of the titanium strip). The seven layer Ni/Zr/Cu/Ti/Cu/Zr/Ni strips are cold rolled to 0.002" thick without intermediate heat treating. FIG. 5 shows the schematic representation of this roll bonded, multi-layered alloy (with the layers as defined herein).

Example 2 of a seven layered foil is Ti-20Zr-20Ni-20Cu. Alloy strip of Monel 400 (Ni-30Cu) 0.020" thick and CDA 713 (Cu-25Ni) 0.010" thick are roll bonded to 0.020" thick 702 Zr to 0.020" bond plate. The bond plates are cold rolled to 0.017" thick and roll-bonded to CPTi at 0.040" to 0.030". The seven layer Monel 400/Zr/CDA713/Ti/CDA713/Zr/Monel400 strips are cold rolled to 0.002" thick without intermediate annealing. FIG. 5 shows the schematic representation of this roll bonded, multi-layered alloy.

Example 3 of a seven layered foil is Ti-20Zr-20Ni-20Cu Alloy strips of Monel 400 (Ni-30Cu) 0.022" thick and CDA 706 (Cu-10Ni) 0.008" thick are roll bonded to 0.020" thick 702 Zr to 0.020" bond plate. The bond plates are cold rolled to 0.017" thick and roll-bonded to CPTi at 0.040" to 0.030". The seven layer Monel400/Zr/CDA706/Ti/CDA706/Zr/Monel400 strips are cold rolled to 0.002" thick without intermediate annealing. FIG. 5 shows the schematic representation of this roll bonded, multi-layered alloy.

Example 4 of a seven layered foil is Ti-20Zr-20Ni-20Cu Alloy strips of 0.010" C 102 Cu, 0.010" N201Ni, and 0.040" grade 2 CPTi are prepared and roll bonded to 0.035" thick bond plates. Two of these bond plates are bonded to 0.020" Zr strip to produce a seven layered composite Ni/Ti/Cu/Zr/Cu/Ti/Ni strip. The seven layered strip is cold rolled to 0.002" without intermediate annealing. FIG. 5 shows the schematic representation of this roll bonded, multi-layered alloy.

Example 5 of a seven layered foil is Ti-37Zr-10Ni-15Cu. Alloy strips of 0.008" C102Cu, 0.005" N201Ni, and 0.040" grade 2 CPTi are prepared and roll bonded to 0.020" thick bond plates. Bond plates Ni/Ti/Cu are cold rolled to 0.015" thick. Two 0.015" bond plates are roll bonded to 0.020" Zr to produce a 7 layered composite Ni/Ti/Cu/Zr/Cu/Ti/Ni strip. The seven layered strip is cold rolled to 0.002" without intermediate annealing.

Differential Thermal Analysis (DTA) is a technique used to characterize the solidus and liquidus of roll bonded Ti—Zr—Ni—Cu alloys. The information is useful to determine the brazing temperature in brazing applications. Typical cooling DTA curves of Ti-20Zr-20Ni-20Cu (first example above, actual weight % of sample: 39Ti-21.6Zr-19.1Ni-19.6Cu-0.1Fe) and that of a Ti-15Ni-15Cu foil are shown in FIG. 6. The liquidus and solidus temperatures are identified from the cooling curve to be 864° C. and 846° C. respectively. These values are far lower than the solidification point 926° C. of Ti15-Ni-15Cu brazing alloy. DTA cooling curve for Ti-37Zr-10Ni-15Cu (fifth example above, actual weight % of sample: 36Ti-37.9Zr-10.3Ni-15.3Cu-0.41Fe) is shown in FIG. 7. The solidification onset temperature is identified at 840° C. Cooling curve for the Ti-15Cu-15Ni alloy is included which shows the onset temperature of solidification at 932° C.

Typical chemical compositions by weight % that can be achieved for seven layered strips and/or foils by the roll bonding process are as follows:

| Example | Layer Arrangement | Ti | Zr | Ni | Cu | Fe |
|---|---|---|---|---|---|---|
| 1 | Ni/Zr/Cu/Ti/Cu/Zr/Ni | 39 | 21.6 | 19.1 | 19.6 | 0.1 |
| 2 | Monel/Zr/C713/Ti/C713/Zr/Monel | 40.5 | 20.8 | 18.5 | 19.7 | 0.44 |
| 3 | Monel/Zr/C706/Ti/C706/Zr/Monel | 40.7 | 20. | 18.8 | 18.8 | 0.55 |
| 4 | Ni/Ti/Cu/Zr/Cu/Ti/Ni | 39.6 | 20.5 | 19.5 | 19.5 | 0.32 |
| 5 | Ni/Ti/Cu/Zr/Cu/Ti/Ni | 36 | 37.9 | 10.3 | 15.3 | 0.41 |

A test of vacuum brazing of Beta Ti alloy provided the following results: An alloy of Ni/Zr/Cu/Ti/Cu/Zr/Ni, nominal composition Ti-20Zr-20Ni-20Cu, from above Example 1, 0.002" thick was placed between Beta-21 Ti alloy of corrugated fin and flat sheet. The stack is placed in a high vacuum furnace (better than $10^{-4}$ torr) and heated to 900° C. in 30 minutes followed by a 10 minutes hold then cooled to ambient. Braze joints are cross-sectioned and examined metallurgically showing good wetting and no voids in the braze joints.

Although examples 1-5 above cover the limited alloy types and thickness values used as well as limited composition, there is no practical limitation of these variables in applying roll bonding. It is preferred to use commercially pure Ti and Zr to avoid interstitials such as carbon, nitrogen and oxygen. Commercially pure Cu and Ni alloys are preferred although alloys of Cu and Ni can also be used. To achieve a useful brazing temperature that it is not exceedingly high, nominal composition by weight % of seven layered strips and/or foils are preferably Ti (30 to 70%), Zr (30 to 70%), Cu (10 to 40%) and Ni (10 to 40%), however other compositions are possible.

A brazing alloy for Ti and Ti alloys can be produced from commercially available materials by the roll bonding process. It is also important to note that the roll bonded multi-layer strip can be cold rolled to the thin thickness needed for brazing without intermediate annealing. The exact layer arrangement is not critical as long as the low ductility components (Ti and Zr) are not exposed to the ambient. This is important to facilitate the cold rolling of the materials to thin gauges. The ductile components, such as Ni and Cu alloys, when roll bonded to Ti and Zr alloys helps to avoid the notch sensitivity in these materials that usually has limited tolerance to cold rolling reduction. The DTA analysis and brazing tests show that the multi-layered brazing alloys provide satisfactory brazing performance. The roll bonding process described herein for the production of brazing strips and/or foils provides a cost-effective method of producing Ti—Zr—Ni—Cu based brazing alloys with lower brazing temperature than the conventional Ti—Ni—Cu based brazing alloys. The brazing temperatures of Ti—Zr—Ni—Cu, 880 to 950° C., are approximately 50 to 100° C. below that of the Ti-15Ni-15Cu products. The reduced brazing temperature will reduce the occurrence of embrittlement in Ti alloys due to the beta transus.

The invention has been described hereinabove using specific examples of processes and components; however, it will be understood by those skilled in the art that various alternatives may be used and various equivalents may be substituted for elements or steps described herein, without deviating from the scope of the invention. Modifications may be necessary to adapt the invention to a particular situation or to particular needs or a particular use without departing from the scope of the invention. It is intended that the invention not be limited to the particular implementation described herein, but that the claims be given their broadest interpretation to cover all embodiments, literal or equivalent, covered thereby, including all substitutions, known or unknown, of equivalents for the specified steps and/or components of the invention.

What is claimed is:

1. A brazing strip or foil comprising:
   a first layer including one or both of nickel and copper;
   a second layer including one or both of 'titanium and zirconium;
   a third layer including one or both of nickel and copper; a fourth layer including one or both of nickel and copper;
   a fifth layer including one or both of titanium and zirconium; a sixth layer including one or both of nickel and copper; and
   a core including one of titanium and zirconium, wherein said core is in a middle of said layers, wherein the weight percentage of the resulting brazing strip or foil results in about a 20Cu-20Ni-20Zr-40Ti alloy upon brazing.

2. A brazing strip or foil comprising:

a first layer including one or both of nickel and copper;

a second layer including one or both of 'titanium and zirconium;

a third layer including one or both of nickel and copper; a fourth layer including one or both of nickel and copper;

a fifth layer including one or both of titanium and zirconium; a sixth layer including one or both of nickel and copper, and a core including one of titanium and zirconium, wherein said core is in a middle of said layers wherein the weight percentage of the resulting brazing strip or foil results in about a 15Cu-10Ni-37Zr-38Ti alloy upon brazing.

3. A brazing strip or foil comprising:

a first layer including one or both of nickel and copper;

a second layer including zirconium;

a third layer including one or both of nickel and copper;

a fourth layer including one or both of nickel and copper;

a fifth layer including zirconium;

a sixth layer including one or both of nickel and copper, and a core layer including titanium layered in the center of said strip or foil, wherein said second layer has a metallic bond with both said first and said third layers, and wherein said core layer has a metallic bond with both said third and said fourth layers, and further wherein said fifth layer has a metallic bond with both said fourth and said sixth layers wherein the metallic bond is formed by roll-bonding without any heat treatment wherein the weight percentage of the resulting brazing strip or foil results in about a 20Cu-20Ni-20Zr-40Ti alloy upon brazing.

4. A brazing strip or foil comprising:

a first layer including one or both of nickel and copper;

a second layer including zirconium;

a third layer including one or both of nickel and copper;

a fourth layer including one or both of nickel and copper;

a fifth layer including zirconium;

a sixth layer including one or both of nickel and copper, and a core layer including titanium layered in the center of said strip or foil, wherein said second layer has a metallic bond with both said first and said third layers, and wherein said core layer has a metallic bond with both said third and said fourth layers, and further wherein said fifth layer has a metallic bond with both said fourth and said sixth layers wherein the metallic bond is formed by roll-bonding without any heat treatment wherein the weight percentage of the resulting brazing strip or foil results in about a 15Cu-10Ni-37Zr-38Ti alloy upon brazing.

* * * * *